United States Patent [19]

Aingworth

[11] Patent Number: 4,644,317
[45] Date of Patent: Feb. 17, 1987

[54] LOW TIRE PRESSURE WARNING DEVICES

[76] Inventor: Richard S. Aingworth, 4 Timber Ct. Main Rd., Strand, Cape Province, South Africa

[21] Appl. No.: 711,032

[22] Filed: Mar. 12, 1985

[30] Foreign Application Priority Data

Mar. 14, 1984 [ZA] South Africa ............... 84/1936

[51] Int. Cl.$^4$ ............................................. B60C 23/00
[52] U.S. Cl. ..................... 340/58; 200/61.25; 116/34 R; 73/146.5; 73/146.8
[58] Field of Search ............ 340/58; 200/61.25, 61.22; 73/146.2, 146.3, 146.4, 146.5, 146.8; 116/34 R; 137/227, 228, 231

[56] References Cited

U.S. PATENT DOCUMENTS 3,999,431 12/1976 Makarainen ............... 340/58 X
4,119,944 10/1978 Smith ............................ 340/58
4,468,650 8/1984 Barbee ......................... 340/58

Primary Examiner—James L. Rowland
Assistant Examiner—Jeffery A. Hofsass
Attorney, Agent, or Firm—Ladas & Parry

[57] ABSTRACT

A low tire pressure warning device comprises a body defining a passage which is connected by air pipes to the valves of two adjacent tires on the axle of a truck. The air pressure in the passage is normally the common pressure of the two tires. If one of the tires develops a leak, the common air pressure drops until a spring-actuated piston moves to seal the passage and closes a set of contacts. A miniature radio transmitter in the body of the device is activated, sending a warning signal to a receiver in the cab of the truck, and further air leakage from the good tire is halted.

9 Claims, 3 Drawing Figures

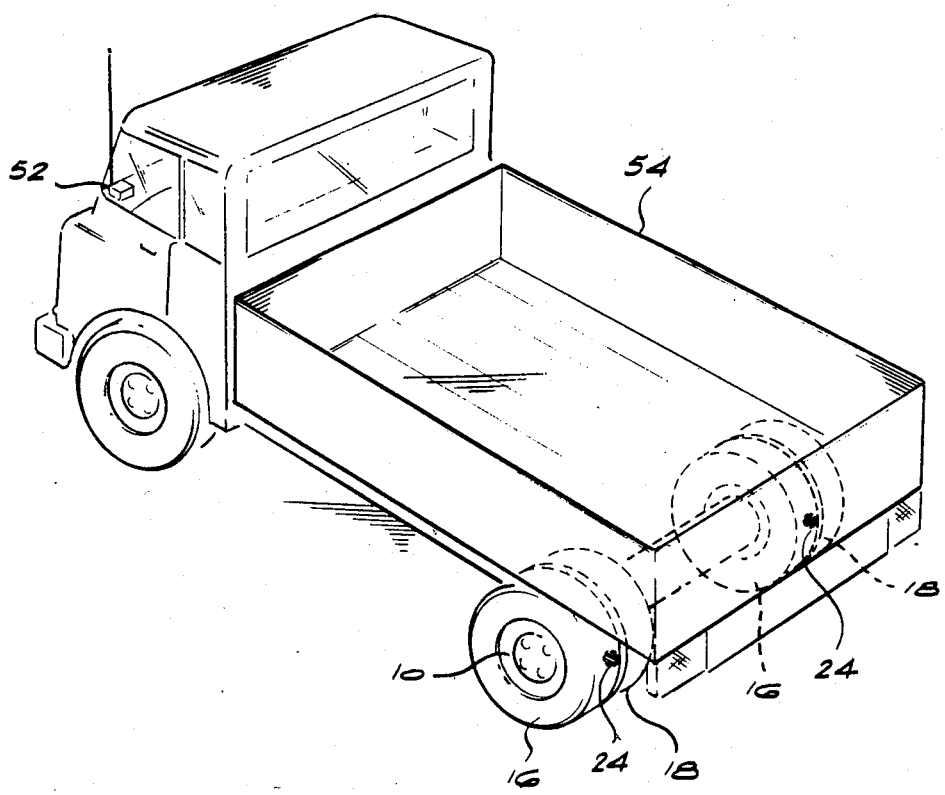

LOW TIRE PRESSURE WARNING DEVICES

BACKGROUND OF THE INVENTION

The invention relates to low tire pressure warning devices.

The invention relates more particularly to such devices for use on vehicles which have two adjacent wheels on the same axle. Although there have already been proposals for tire pressure warning devices including devices incorporating means for signalling when tires deflate wholly or partially so far such devices have not been wholly satisfactory and have not been specifically directed or useful for simultaneously monitoring the tire pressures of adjacent tires. Commonly commercial vehicles have wheels mounted in pairs.

SUMMARY OF THE INVENTION

According to the invention there is provided a low tire pressure warning device for monitoring the pressure of two tires mounted on adjacent wheels of a vehicle, the device comprising a body mounted on one of the wheels, means for connecting the valves of the tires which are formed partially by a passage in the body, a piston arranged to be urged in one direction by air in the passage and biassed in the opposite direction to move to cause electrical contacts to close such that if the common air pressure falls below a predetermined value the piston moves to close off the passage and close the contacts, and a battery operated radio transmitter supported by the body arranged to generate a warning output signal whenever the contacts are closed.

The body may be mounted on the outlet valve of one of the tires, in which case no modifications are required in order to fit the device.

The body may be mounted adjacent the hub of one of the wheels and connected to the tire outlet valves via air pipes.

Preferably, the transmitter is arranged to be turned on when the contact means close. However, the transmitter may be arranged to transmit continuously or intermittently at all times and to vary its frequency or repetitive periods of transmission whenever the contact means close to provide the warning signal accordingly.

BRIEF DESCRIPTION OF THE DRAWING

A low pressure warning device according to the invention will now be described by way of example with reference to the accompanying schematic drawing in which:

FIG. 3 is a pictorial representatin of a vehicle with the device mounted thereon.

DESCRIPTION OF A PREFERRED EMBODIMENT

Figure 1:
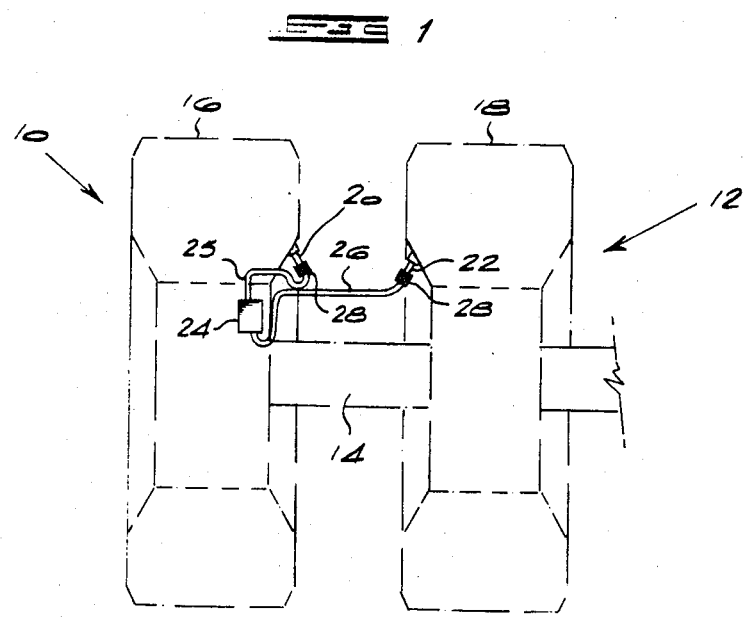
FIG. 1 is a cross-section view of two adjacent wheels of a vehicle.

Referring to the drawing, in FIG. 1 two wheels 10 and 12 are mounted on a common axle 14 of a vehicle 54. Tires 16 and 18 on the respective wheels have tire valve outlet stems 20 and 22. A low pressure warning device 24 is mounted adjacent the hub of the wheel 10 and connected to the valve outlet stems 20 and 22 by flexible air lines 25 and 26. The air lines 25 and 26 are fitted with screw-on couplings 28 which are screwed on to the valve stems 20 and 22. The couplings 28 are provided with a formation which presses down conventional valve plungers in the valve stems 20 and 22, allowing air form the tires 16 and 18 to be admitted to the device 24.

Figure 2:
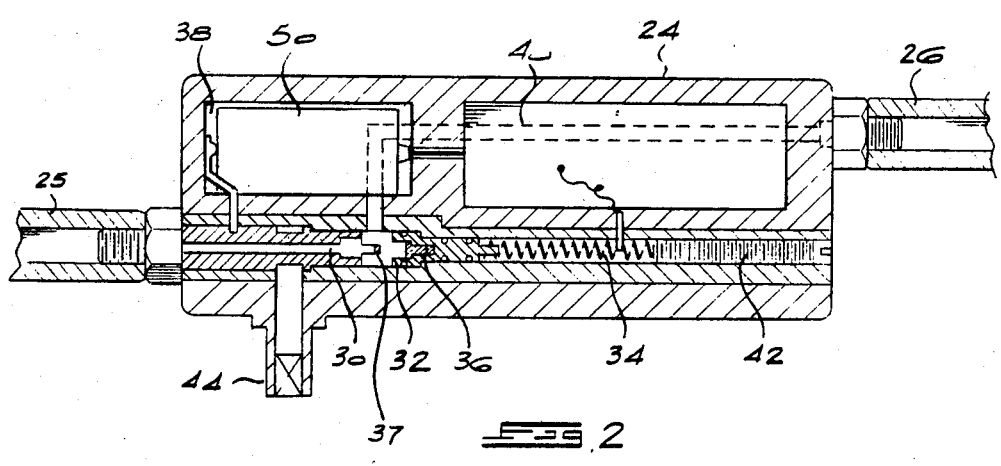
FIG. 2 is a partial cross-sectional elevation of the device.

In FIG. 2, the body of the device 24 includes a passage 30 in which the air pressure normally is the common air pressure of the two tires 16 and 18 at any time. A piston 32, biassed by a spring 34, moves to close electrical contacts 36 and 37 if the common air pressure falls below a predetermined value. As long as the common air pressure is above this value, the air pressure in the passage 30 acting on the piston 32 maintains a separation between the contacts 36 and 37. When the piston 32 moves toward the contact 37 and causes the contacts 36 and 37 to close, it also closes off the passage 30 to isolate the two tires. This means that if one tire is faulty the air from the other tire bleeds into the faulty tire via the passage 30 only until such time as the common pressure falls to the predetermined value.

When the contacts 36 and 37 close, a battery 50 in the compartment 38 is connected electrically to a radio transmitter 40. This turns on the transmitter 40 which produces a warning output signal. A radio receiver 52 is provided in the cab of the vehicle 54 to pick up the output signal of the transmitter 40 and to provide an audible and/or visual warning for the driver of the vehicle.

It will be noted that the predetermined common pressure at which the contacts 36 and 37 close can be adjusted by turning a screw 42 mounted in the body of the device 24.

The tires 16 and 18 can be normally inflated simultaneously via a valve 44. Even if the piston 32 has moved to seal the passage 30 due to a leak in one of the tires 16 and 18, the higher pressure of the inflation air supply will force the piston 32 back until the passage 30 is open, thus allowing air to be forced into both tires 16 and 18.

I claim:

1. A low tire pressure warning device for monitoring the air pressure in two tires mounted on adjacent wheels of a vehicle, each tire having a valve, the device comprising a body mounted on one of the wheels; means for connecting the valves of the tires formed partially by a passage in the body, the passage normally allowing air to flow freely between the two tires such that the passage contains air at the common pressure of the two tires; a first electrical contact in the passage; a piston in the passage having a second electrical contact thereon arranged to be urged away from the first electrical contact by the pressure of air in the passage, the piston being biased toward the first electrical contact; and a battery powered radio transmitter supported by the body which produces a warning output signal when the electrical contacts are closed, the air pressure in the passage normally being sufficient to hold the piston away from the first electrical contact, the piston moving to close the contacts and to seal the passage between the two tires when the air pressure in the passage falls below a predetermined value.

2. A low tire pressure warning device according to claim 1 mounted on a valve of one of the tires.

3. A low tire pressure warning device according to claim 1 mounted adjacent the hub of one of the wheels and connected to the valves of the tires by air pipes.

4. A low tire pressure warning device according to claim 1 having an auxiliary valve communicating with the passage in the body through which air may be introduced into the tires.

5. A low tire pressure warning device according to claim 1 in which the piston is biassed toward the first electrical contact by a spring, an adjustment screw being provided with its threaded end bearing against the end of the spring remote from the piston to thereby compress the spring, such that turning the screw increases or decreases the compression of the spring and respectively raises or lowers the predetermined value of air pressure in the passage at which the piston moves to close the contacts.

6. A low tire pressure warning device according to claim 5 in which at least part of the spring and the piston are in series with the transmitter and its associated battery when the contacts are closed.

7. A low tire pressure warning device according to claim 1 in which the transmitter emits signals under normal conditions, the characteristics of the signals being altered when the contacts are closed.

8. A low tire pressure warning device according to claim 1 in combination with a radio receiver mounted in the cab of the vehicle, the radio receiver providing a warning signal to the drive of the vehicle in response to transmission of the warning output signal by the radio transmitter.

9. A low tire pressure warning device for monitoring the air pressure in two tires mounted on adjacent wheels of a vehicle, each tire having a valve, the device comprising:
- a body for mounting on one of the wheels;
- means for connecting the valves of the tires comprising two air lines each fitted with a coupling at one end and terminating in a common passage in the body at the other end, the couplings fitting over the valves of the tires to form an air-tight seal, the passage normally allowing air to flow freely between the two tires such that the passage contains air at the common pressure of the two tires;
- a valve communicating with the passage through which air may be introduced into the tires;
- a first electrical contact in the passage;
- a piston movable in the passage under the pressure of air in the passage;
- a second electrical contact on the piston;
- a spring bearing against the rear of the piston and urging the piston toward the first electrical contact;
- an adjustment screw bearing against the end of the spring remote from the piston to compress the spring;
- a battery powered radio transmitter supported by the body which produces a warning signal when the contacts are closed, the contacts, the piston and at least part of the spring being in series with the battery and the transmitter, the air pressure in the passage normally being sufficient to hold the piston away from the first electrical contact, the piston moving to close the contacts and to seal the passage between the two tires under the pressure of the spring when the air pressure in the passage falls below a predetermined value alterable by turning of the adjustment screw;
- and a radio receiver mounted in the cab of the vehicle, the radio receiver providing a warning signal to the driver of the vehicle in response to transmission of the warning output signal by the radio transmitter.

* * * * *